United States Patent [19]

Zlobinsky et al.

[11] 4,146,526
[45] Mar. 27, 1979

[54] COLD-SETTING MIXTURE FOR THE PRODUCTION OF CASTING MOULDS AND CORES

[76] Inventors: Boris A. Zlobinsky, ulitsa Zodchikh, 36, kv. 213; Grigory S. Cherny, ulitsa Berdichevskaya, 4, kv. 53; Felix P. Shvartsman, ulitsa Sevastopolskaya, 23; Vladimir V. Egorov, ulitsa Shaumiana, 52, kv. 2; Valery G. Merkulov, ulitsa Yakuba Kolasa, 21, kv. 164; Anatoly E. Sokolov, Brest-Litovsky prospekt, 17, kv. 47; Nikolai I. Sheiko, prospekt Radyanskoi Ukrainy, 14, kv. 53, all of Kiev, U.S.S.R.

[21] Appl. No.: 775,855

[22] Filed: Mar. 9, 1977

[30] Foreign Application Priority Data

Mar. 15, 1976 [SU] U.S.S.R. .................... 2338094

[51] Int. Cl.$^2$ ............................................. C08K 3/36
[52] U.S. Cl. .................... 260/37 N; 164/43; 260/38
[58] Field of Search .......... 260/59 R, DIG. 40, 37 N, 260/38

[56] References Cited

U.S. PATENT DOCUMENTS 2,487,207  11/1949  Adams .................... 260/DIG. 40
2,975,494  3/1961   Cooper .................... 260/DIG. 40
3,726,867  4/1973   Robins .................... 260/DIG. 40

*Primary Examiner*—Sandra M. Person
*Attorney, Agent, or Firm*—Lackenbach, Lilling & Siegel

[57] ABSTRACT

A cold-setting mixture for the production of casting moulds and cores comprises the following components, in parts by weight:
- refractory filler — 100
- binder, viz., novolac phenol-formaldehyde resin — 0.5 to 5.0
- hardener, viz., polyisocyanate — 0.005 to 1.0
- organic solvent — 0.5 to 5.0
- hardening catalyst — 0.0025 to 5.0

The catalyst employed in this mixture is a composition which comprises silicates and aluminates of alkaline-earth metals, cements, slags of ferrochrome manufacturing process, nepheline slurry and basic salts, e.g. sodium carbonate.

The catalyst due to easy proportioning thereof, makes it possible to reduce the cost of the mixture, reduce the amount of polyisocyanate required, and simplify the preparation of this mixture.

The proposed cold-setting mixture has enhanced strength properties and improves the quality of casting mould and cores being made therefrom.

6 Claims, No Drawings

COLD-SETTING MIXTURE FOR THE PRODUCTION OF CASTING MOULDS AND CORES

The present invention relates to the field foundry practice, and more particularly to compositions for cold-setting mixtures for the production of casting moulds and cores. The casting moulds and cores are required for casting articles from metal alloys. Cold-setting mixtures comprise a refractory filler, a binder, a solvent and a hardener.

Rapid developments in the field of binding materials during the last two decades had a marked effect on the process of manufacturing moulds and cores. Organic polymer binders have been promptly adapted for application.

One of the particularly promising trends in the technology of manufacturing casting moulds and cores in a process of manufacturing thereof from cold-setting mixtures containing a polymer binder.

The technology of manufacturing casting moulds and cores with the use of cold-setting mixtures ensures the production of castings having their configurations, dimensions, and surface finish held to very strict tolerances, and readily lends itself to automation and mechanisation.

The term "a cold-setting mixture" is used here and hereafter to denote a mixture self-curing at room temperature, i.e. under normal conditions.

There are known in the art cold-setting mixtures which can be used for manufacturing casting moulds and cores therefrom, containing a refractory filler, for example, quartz sand, a binder such as novolac phenol-formaldehyde resin, a hardener such as polyisocyanate, an organic solvent and a hardening catalyst. Pyridine compounds, such as pyridine, phenyl pyridine, 2-methylpyridine, and quinoline, etc., are made use of as a hardening catalyst. The ratio of the components in the mixture in parts by weight is as follows:

quartz sand — 100
phenol-formaldehyde resin — 0.5
solvent — 0.7
polyisocyanate — 0.8
catalyst — 0.05

The above-mentioned catalysts are highly toxic substances with extremely pungent odor, and, therefore, are difficult to handle. Moreover, pyridine compounds are costly and critical substances.

There is also known in the art a cold-setting mixture comprising a refractory filler, a binder, viz., phenol-formaldehyde resin, a hardener, viz., polyisocyanate, an organic solvent and a hardening catalyst comprising oxides and hydroxides of mono or bivalent metals including alkaline-earth metals. However, the physical-and-mechanical characteristics of said mixture require further improvements, especially when production of cores with intricate configuration is required. Moreover, the compounds being used as the catalyst have a pronounced alkalinity and, therefore, require the observance of safety precautions. They are difficult to proportion and uniformly distribute within the mixture.

The principal object of the invention is to provide a cold-setting mixture for the production of casting moulds and cores, which will enable cutting down the production costs, improve working conditions and feature high strength characteristics.

This object is accomplished by the provision of a cold-setting mixture for the production of casting moulds and cores comprising a refractory filler, a polymer binder, an organic solvent, a hardener and a hardening catalyst, said mixture, according to the invention, containing as the hardening catalyst a composition containing silicates and aluminates of alkaline-earth metals or basic salts, with the following ratio of the components in weight parts:

refractory filler — 100
binder, viz., novolac phenol-formaldehyde resin — 0.5 to 5.0
hardener, viz., polyisocyanate — 0.005 to 1.0
organic solvent — 0.5 to 5.0
hardening catalyst — 0.0025 to 5.0

The herein proposed cold-setting mixture is noted for higher strength properties and improves the quality of casting moulds and cores made therefrom.

According to the invention, the hardening catalyst used can be various cements in an amount of 0.05 to 5.0 parts by weight. It is also possible to use slags from ferrochrome-manufacturing process in an amount of 0.05 to 5.0 parts by weight or nepheline slurry in an amount of 0.05 to 5.0 parts by weight, said slurry being a waste product of the alumina-manufacturing process. This waste product can be thus used to advantage.

In accordance with the invention the hardening catalyst can also be powdery pearlite in an amount of 0.05 to 5.0 parts by weight. This powdery pearlite is produced by heating pearlite rock.

The incorporation of cement, slag of ferrochrome-manufacturing process or nepheline slurry, as well as pearlite into the composition of the cold-setting mixture for casting moulds and cores makes it possible to simplify and cheapen the preparation of said mixture since these components are simple to proportion and easily available. The basic salts being employed are sodium, potassium, calcium, magnesium and barium carbonates, sodium acetate, potassium citrate and other suitable salts. All these substances are also available and easy to proportion while preparing the mixture.

The refractory filler used can be quartz sand, olivine or disthene-sillimanite sands, and other refractory materials. The organic solvent being employed can be toluene, acetone, dioxane, cellosolve acetate, alcohols and other solvents which are capable of dissolving phenol-formaldehyde resin. The application of said substances as the catalyst simplifies the production of the cold-setting mixture since these substances are easy to proportion and transport, and being non-toxic allow an improvement in working conditions.

The aforesaid hardening catalyst allows controlling the rate of mixture, hardening within a wide range, namely, from 30 seconds to 30 minutes, which extends the scope of application of the proposed cold-setting mixture in various foundry processes.

With said catalyst the required amounts of costly polyisocyanate are diminished, and thus the proposed cold setting mixture becomes materially less expensive. With the thus reduced amount of polyisocyanate in the mixture the amount of gas formed therein is likwise reduced, which improves the quality of castings.

Depending on the mixture longevity, which ranges from 0.02 to 15 min., various types of conventional equipment can be used for commercial production of casting moulds and cores.

Mixtures with a longevity of up to 0.1 min. can be prepared and used on units Type KCBS-12 ("Gisag", DDR). It will be reasonable to employ various continuous action screw mixers for preparing mixtures having a longevity of from 3 to 5 minutes. Mixtures with a longevity of more than 5 minutes can be prepared in batch mixers of various capacity.

For a better understanding, the invention will now be illustrated by the following example.

of more than 120 conventional units, looseness of from 0.1 to 0.2%, and gas forming of from 9 to 11 cm$^3$/g.

These characteristics of the proposed mixtures demonstrate their high production properties which tells favourably on the quality of moulds and cores manufactured therefrom and, hence on, the quality of the castings produced.

Table 1

| Components | Content of components, weight parts — Mixture Number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Quartz sand | 100 | 100 | 100 | 100 | 100 | 100 | 100 | 100 | 100 | 100 | 100 | 100 |
| Phenol-formaldehyde novolac resin | 0.5 | 0.5 | 0.5 | 1.35 | 1.35 | 1.35 | 5.0 | 5.0 | 5.0 | 1.4 | 1.4 | 1.4 |
| Solvent viz. Acetone | 0.5 | 0.5 | 0.5 | 1.35 | 1.35 | 1.35 | 5.0 | 5.0 | 5.0 | — | — | 1.4 |
| Solvent viz., 50% Acetone 50% toluene | — | — | — | — | — | — | — | — | — | 1.4 | 1.4 | — |
| Polyisocyanate containing 55% of diphenylmethane diisocyanate | 0.05 | 0.5 | 0.5 | 0.15 | 0.15 | 0.15 | 1.0 | 1.0 | 1.0 | — | 0.1 | 0.3 |
| Toluenediisocyanate | — | — | — | — | — | — | — | — | — | 0.1 | — | — |
| Sodium bicarbonate | 0.0025 | — | — | 0.025 | — | — | 0.25 | — | — | — | — | — |
| Cement | — | 0.05 | — | — | 1.0 | — | — | 5.0 | — | — | — | — |
| Ferrochrome slag | — | — | 0.05 | — | — | 0.2 | — | — | 5.0 | — | — | — |
| Nepheline slurry | — | — | — | — | — | — | — | — | — | 0.5 | — | — |
| Pearlite | — | — | — | — | — | — | — | — | — | — | 2.0 | — |
| Calcium carbonate | — | — | — | — | — | — | — | — | — | — | — | 0.25 |

Table 2

| Time interval after the preparation of specimens, hours | Compressive strength of specimens, kgf/cm$^2$ — Mixture Number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0.1 | 0.6 | 0.4 | 0.3 | 3.0 | 2.0 | 0.3 | 0.8 | 0.5 | 0.3 | 0.5 | 4.5 | 0.7 |
| 0.5 | 1.5 | 1.5 | 1.0 | 20.5 | 19.5 | 9.5 | 4.5 | 5.0 | 7.5 | 15.5 | 10.5 | 12.5 |
| 1.0 | 2.0 | 2.0 | 2.5 | 54.5 | 46.0 | 20.5 | 9.5 | 8.0 | 11.0 | 25.0 | 24.0 | 41.5 |
| 3.0 | 6.0 | 5.0 | 4.5 | 67.5 | 67.5 | 54.0 | 15.0 | 20.5 | 22.5 | 38.5 | 47.0 | 48.0 |
| 24.0 | 8.5 | 7.5 | 7.0 | 81.0 | 73.0 | 65.0 | 95.5 | 129.5 | 108.0 | 68.5 | 70.5 | 56.5 |

A cold-setting mixture is prepared in a mixer provided with a stirrer. For preparing a single batch of the mixture, a mixer is charged with 2 kg of quartz sand which is taken for 100 weight parts, and with other above-cited components in amounts according to the above-said formulation. Prior to this operation, novolac phenol-formaldehyde resin is dissolved in an organic solvent. All the mixture components are stirred for 10 minutes. The resultant mixture is then discharged from the mixer, and standard cylindrical specimens with a diameter of 50 mm and 50 mm in height are prepared from it. The weight of these specimens was 160 grams. After 0.1, 0.5, 1.3 and 24 hours the specimens thus obtained were subjected to compression tests.

The compositions of the prepared cold-setting mixtures are shown in Table 1, and the results thereof are shown in Table 2.

As can be seen from these tables, the mixtures of the present invention have higher strength properties. The longevity of the mixtures given in Table 1 ranges from 0.02 to 15 minutes and can be adjusted by an appropriate amount of the hardening catalyst. The mixtures No. 3 and No. 11 have a longevity of from 0.06 to 0.1 minutes. Mixture No. 5 has a longevity of 0.2 minutes. The longevity of other mixtures given in Table 1 was more than 1 minute. Mixtures No. 4, No. 5, No. 6, No. 10, No. 11 and No. 12 (optimal properties) have gas permeability

What is claimed is:

1. In a cold-setting mixture for the production of casting molds and cores, comprising the following components, in parts by weight:
   refractory filler — 100
   binder, novolac phenol-formaldehyde resin — 0.5 to 5.0
   hardener, polyisocyanate — 0.005 to 1.0
   organic solvent — 0.5 to 5.0;
   The improvement which comprises a hardening catalyst comprising silicates and aluminates of alkaline-earth metals or basic salts — 0.0025 to 5.0

2. A cold-setting mixture of claim 1, wherein the catalyst is cement in an amount of 0.05 to 5.0 parts by weight.

3. A cold-setting mixture of claim 1, wherein the catalyst is ferrochrome slag in an amount of 0.05 to 5.0 parts by weight.

4. A cold-setting mixture of claim 1, wherein the catalyst is nepheline slurry in an amount of 0.05 to 5.0 parts by weight.

5. A cold-setting mixture of claim 1, wherein the catalyst is powdery pearlite in an amount of 0.05 to 5.0 parts by weight.

6. A cold-setting mixture of claim 1, wherein the catalyst is sodium carbonate in an amount of 0.0025 to 0.25 parts by weight.

* * * * *